Feb. 16, 1960 E. J. HELLUND 2,924,894
COMPRESSOR PLANT ANALOG

Filed July 5, 1957 3 Sheets-Sheet 1

EMIL J. HELLUND
INVENTOR.

BY
ATTORNEY

Feb. 16, 1960     E. J. HELLUND     2,924,894
COMPRESSOR PLANT ANALOG
Filed July 5, 1957     3 Sheets-Sheet 2
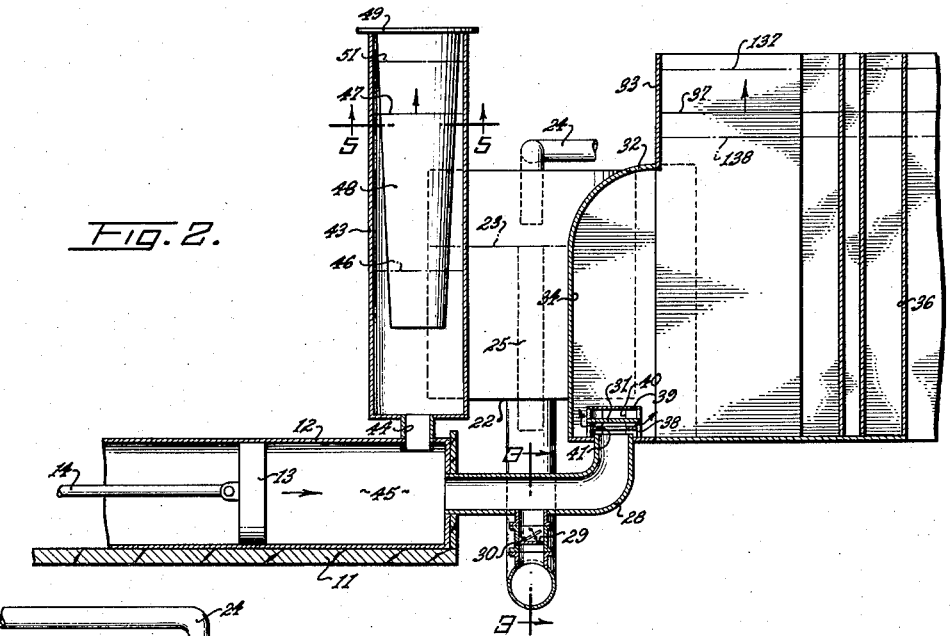
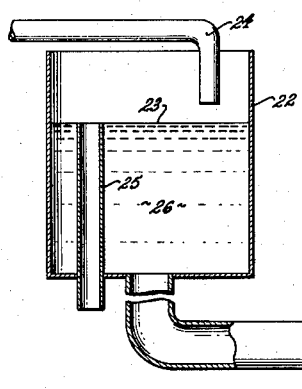
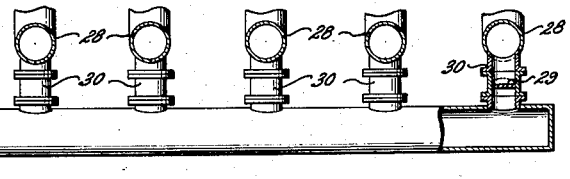
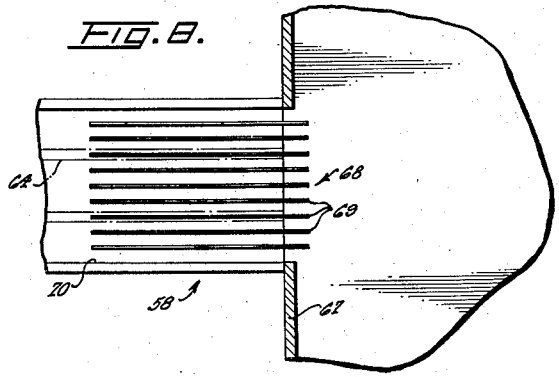
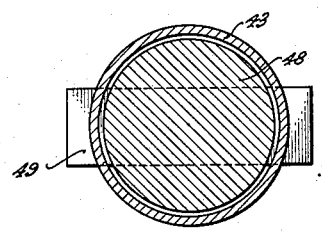
EMIL J. HELLUND
INVENTOR.
BY N. Calvin White
ATTORNEY

EMIL J. HELLUND
INVENTOR.

BY
ATTORNEY

United States Patent Office 2,924,894
Patented Feb. 16, 1960

2,924,894

COMPRESSOR PLANT ANALOG

Emil J. Hellund, South Laguna, Calif., assignor to The Fluor Corporation, Ltd., Los Angeles, Calif., a corporation of California Application July 5, 1957, Serial No. 670,324

43 Claims. (Cl. 35—19)

This invention relates generally to liquid analogs of fluid systems, and more particularly concerns the representation of wave propagation through a compressible or incompressible fluid medium in a pipe or duct by means of a liquid analog in which equivalent disturbances propagate in an observable manner along a liquid channel, the design of the analog channel being such that the disturbances propagating therealong are subject to distortion approximating the characteristic distortion of the waves propagating in the fluid. The invention directly concerns a novel method and means for simulating the propagation of compressor created gas pulsations through the use of a hydrodynamic analog device including a channeled body of liquid and means for repeatedly displacing liquid in the channel to create equivalent liquid disturbances propagating along the channel, the disturbances having shapes analogous to those of the gas pulses.

It is a major purpose of the invention to provide a liquid analog capable of accurately simulating propagation of a complex wave or waves through fluid within a conduit or pipe, the analog taking into consideration the fact that complex waves are made up generally of fundamental and harmonic components including reflections which become superposed when they overlap in traveling upstream and downstream in the conduit. These wave components are all subject to progressive distortion during wave propagation as a result of the elasticity of the fluid medium acting to increase the velocity of fluid particles at higher amplitudes relative to particles at lesser amplitudes, and productive of shock conditions at the wave fronts in a manner similar to so-called "cresting" of ocean waves to form white caps. Such progressive wave shocking has the effect of forming additional waves of unpredictable frequency and shape, and it can readily be seen that the pulsative conditions that might exist in a gas pipe line are difficult of accurate determination, and especially so in view of the high velocity of the pulses in the gas. The present liquid analog device is designed to take all of these factors into account in simulating propagation of waves in fluids by means of deep channel disturbances propagating through a liquid canal and visibly along the surface thereof.

In general, it is known that the frequency and wave shapes of compressor-created pressure pulsations in gas transmission lines are determined by the action on the gas of all the compressor and piping parts through which and by which the gas flows, including the compressor pistons, valve openings, valves, nozzles, piping, and pipe bends. If a pulsation dampener is connected in series between the compressor and the transmission line, it too acts on the gas, normally attenuating the pressure pulsations within a desired range of frequencies, as determined by the design of the dampener.

In order to optimize the dampener design for the removal of the desired frequency pulsations, it is necessary to obtain accurate knowledge as to the pressures, amplitudes, velocities and other characteristic properties of the gas and pulsations propagating therein at different points in the system, with and without the installation of different dampeners therein. Using such knowledge, it is possible but impractical to mathematically predict approximately the performance of a given pulsation dampener, since the trial and error system of design is costly when applied to a large scale complex system involving many compressors. More importantly, once a dampener has been designed for application to and combination with a particular compressor, the expense involved in altering its construction to optimize dampener operation is always objectionable.

In order to obviate the above difficulties, the present invention incorporates the use of a hydrodynamic analog for the compressor system, a flow analog being ideally suitable in order to maintain strict one-to-one correspondence between the waves and disturbances propagating in the gas piping and the liquid channel respectively, and a liquid flow analog being employed so that the entire plant system may be surveyed visually.

The liquid analog is characterized by representation of gas flow in terms of liquid flow in a canal or channel, with deep canal waves propagating along the channel, as evidenced by surface disturbances or waves, corresponding to pressure pulsations traveling in the gas. In other words, successive elements of the liquid in the canal move back and forth during passage of a wave downstream in the channel, in a manner similar to the motion of the gas molecules in the pipe line associated with pressure pulse propagation, the incompressible nature of the liquid being compensated for by upward displacement of the free surface thereof in the form of a wave as the subsurface liquid is displaced back and forth during wave propagation along the channel.

As applied to simulating pulse propagation in a fluid medium such as gas confined in a pipe along which the wave travels, the analog liquid channel must be sized in such a way that disturbances propagating along the channel as deep channel waves are subject to distortion similar to pulse distortion in the gas pipeline, for otherwise the analog would not truly be representative of pulsative conditions in the gas line. Thus, the invention takes into consideration the fact that pulse propagation velocity in an elastic medium such as gas varies with the amplitudes of different portions of the pulse to create progressive pulse distortion during propagation, through the provision of means for adjusting the liquid channel cross section along the channel length so as to control the amplitudes of disturbances propagating along the liquid surface and thereby control the propagation velocity and hence the distortion of the disturbance to be like the pulse distortion.

As concerns the study of pressure pulses propagating in a gas transmission line, the hydrodynamic analog is required, for purposes of evaluation, to have a characteristic predetermined channel cross section related to the fundamental frequency of the input disturbance and the channel length such that the ratio of disturbance fundamental wave length to channel length is substantially the same as the ratio of gas pulsation fundamental wave length to transmission line length. Fundamental wave length in the foregoing refers to wave length at the fundamental frequency as opposed to harmonics of that frequency.

Furthermore, sizing of the liquid channel as described above assures that the amplitude ratios of harmonic gas pulses to fundamental gas pulses will be the same as the amplitude ratios of corresponding harmonic liquid disturbances to fundamental liquid disturbances, giving the same complex wave shapes in the case of both the gas pulses and liquid disturbances.

In order to aid visual interpretation of the liquid disturbances traveling rather slowly in the hydrodynamic analog, the invention proposes the use of a channel that is sufficiently transparent to enable visual inspection and photographing of the liquid surface along which the disturbances propagate, the width of the channel being preferably reduced or narrowed at the liquid surface so as to cause amplification of the visible surface wave motion. Thus, the channel may be made of a transparent plastic or glass, especially at the reduced neck portion thereof, as will be described. Controlling the reduced channel width at the liquid free surface also permits varying the disturbance amplitude for the purposes described above, without appreciably affecting the channel cross sectional area so as to maintain a desired one-to-one correspondence between pulse and disturbance propagation velocities.

That part of the hydrodynamic analog corresponding to the gas compressor constitutes a reciprocating pump from which liquid is expelled through a valve and into a nozzle, for subsequent discharge downstream, as for example into the multi-channel analogy of a pulsation dampener the design of which may be conveniently optimized by changing the dampener channel geometry. Varied pressure application on the liquid just prior to and during expelling thereof from the pump through the valve, corresponding to the polytropic compression and sudden release of gas in the compressor cylinder creative of pressure pulsations, is facilitated by the use of a surge tank above the pump and communicating with the liquid therein, the tank dimensions being such as to cause the surging liquid head to increase in conformance with the pressure increase of the gas in the compressor cylinder. Also, the analogy to compressor operation is maintained after the discharge valve is opened since liquid in the surge tank then communicates with the discharge nozzle analog in the form of a deep canal, with the result that the liquid heads therein remain approximately at the same level while the valve is open.

Other features of the invention include means into which channel liquid slowly flows or empties from the canal at the end thereof, together with means for suppressing the propagating disturbances in the canal liquid prior to said discharge, so as to prevent the formation of upstream traveling disturbances or reflections, and thus simulating an "infinitely" long gas transmission line. Also, specific design requirements imposed on the channels and the pumps will be discussed. Finally, the invention provides certain instrumentation used in connection with the channel liquid for measuring the frequency of disturbance propagation and the disturbance amplitude.

These and other features and objects of the invention, as well as the details of an illustrative embodiment, will be more fully understood from the following detailed description of the drawings, in which:

Fig. 2 is an enlarged section taken through a portion of the analog showing the liquid pump and valving associated with pump action;

Fig. 3 is a section taken on line 3—3 of Fig. 2;

Fig. 5 is a cross section taken on line 5—5 of Fig. 2;

Fig. 8 is a section taken on line 8—8 of Fig. 1.

Figure 1:
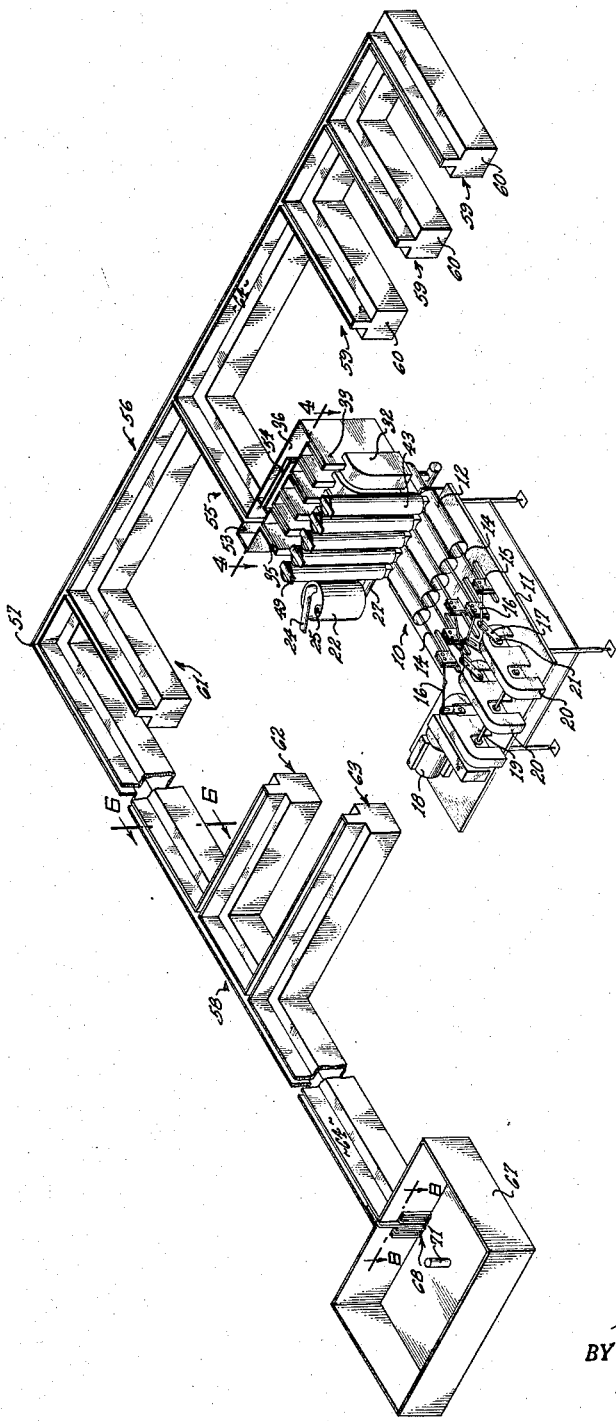
Fig. 1 is a perspective layout showing the entire hydrodynamic analog of a representative compressor plant installation.

In the drawings, the analog of a compressor installation having five cylinders discharging into a common header is illustrated by the five cylinder reciprocating pump unit 10, including a table 11 mounting five cylinders 12 extending horizontally and in a parallel bank. The cylinder pistons 13, better shown in Fig. 2, are reciprocated by piston rods 14 attached to guides 15, which are in turn driven back and forth by links 16 attached to crank arms 17. A suitable driving mechanism, as for example the gear motor 18 shown, rotates a shaft 19 coupled to the cranks 17 through suitable gearing in the housings 20, which gearing is not shown. It will be understood that differences in phasing or crank angles as respects the cranks 17 and stroking of the pistons 13 may be adjusted by loosening appropriate fasteners 21 connecting the cranks 17 to their drive shafts, so that the cranks may be relatively rotated and thereafter fixed in desired phase relation. Also, the speeds of all of the pistons may be changed by increasing or decreasing the speed of gear motor 18, and it is possible to adjust the rates of reciprocation as between the different pistons as by changing the gears in the housings 20. Therefore, any combination of phasing and relative piston speeds may be achieved to duplicate any field compressor system, all for the purposes of pulse analysis and attenuation as will appear. It is also possible to adjust the length of the piston stroke by adjusting the position at which arm 16 connects with arm 17.

Figure 4:
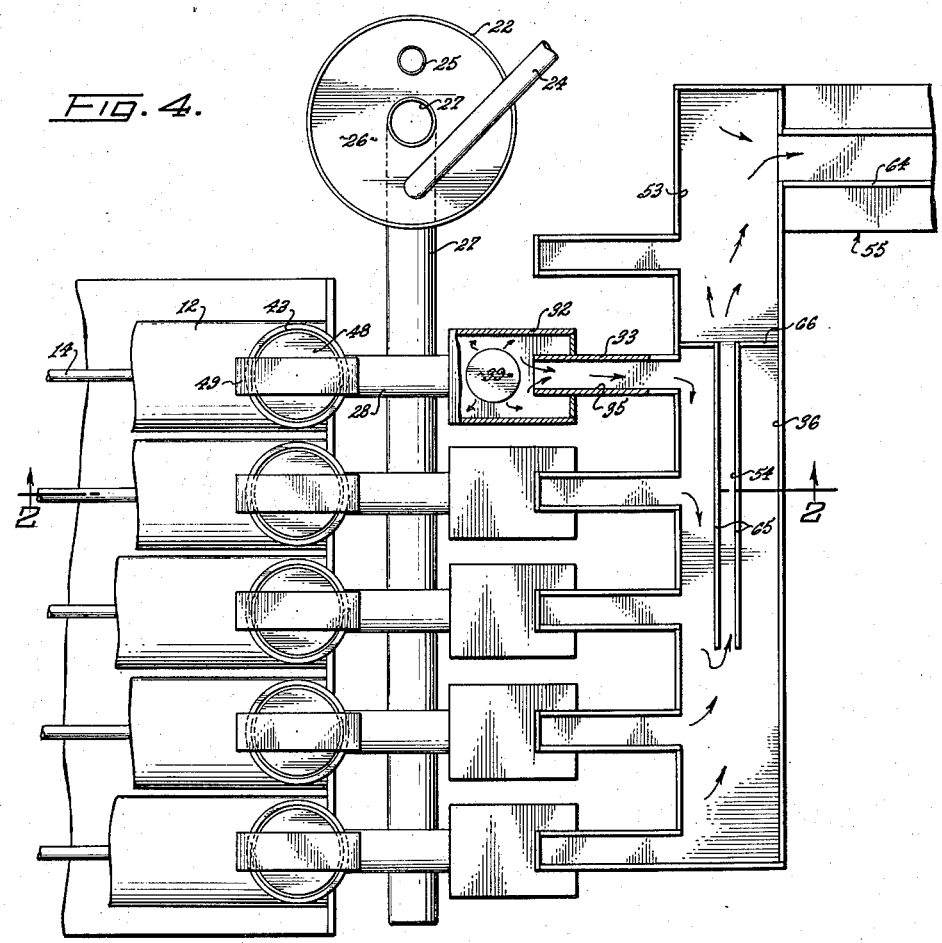
Fig. 4 is a plan view illustrative of the same portion of the analog taken on line 4—4 of Fig. 1.

Turning now to Figs. 2 through 4, a suitable liquid such as water is supplied to the pistons in the cylinders from tank 22, wherein the liquid head is kept at a constant level 23 with respect to the pistons by in-flow through duct 24 and out-flow through overflow pipe 25. Liquid 26 in the tank is delivered through the bottom thereof into a line 27 extending transversely beneath the five pipes 28 projecting forwardly from the forward ends of the cylinders 12. Upon piston retraction, liquid is drawn from pipe 27 upwardly through flap valves 29 in risers 30 communicating between the pipes 27 and 28, all as shown in Fig. 2, and in a manner such as to maintain the cylinders full of liquid.

The forward ends of pipes 28 turn upwardly and discharge through valves 31 into risers 32, respectively associated with channels 33, and analogous to the nozzles in a compressor installation, valves 31 being likewise analogous to compressor valves which open and close under differential pressure application to opposite sides thereof.

As regards the pipes 28, they are preferably as short as possible to minimize their inductive or dampening effect upon the transmission of periodic disturbances in the liquid, and at the same time should be suitably large in diameter or cross section as to eliminate pressure drops for all practical purposes. These considerations are imposed due to the actual proximity of the discharge valve, in the case of the compressor installation, to the compressor cylinder, whereas in the analog each discharge valve is preferably located at the base of a riser 32 so that liquid may discharge through the valve directly into the riser space 34.

The use of the riser is required for the purpose of obtaining substantially uniform liquid discharge laterally into the nozzle channels 35 as viewed in Fig. 4, in order to create what are known as deep channel waves or disturbances therein, evidencing their presence by surface waves or disturbances propagating down the nozzle channels toward and into the common liquid channel 36. Upward liquid discharge into the riser space 34 occurs whenever the downward pressure on the valve plate 31 equal to the head of liquid below the surface 37 in the nozzles is exceeded by the upward pressure of liquid in the piping 28 exerted on the plate 31, the pressure differential serving to lift the plate, which is guided between the circumferentially spaced upstanding flutes 38, upward plate travel being arrested by upward engagement with the stop 39 extending across the tops of the flutes. At this time liquid discharges laterally between the spaces 40. Also initially lifted with the valve plate 31 is an annular under plate 41 which drops back down against the discharge end of pipe 28 prior to subsequent dropping of the valve plate 31 due to liquid escape through the central opening in the under plate. The two plates 31 and 41 together with their associated guide structure are utilized in order to approximate the timing and amplitude characteristics of the pressure change associated with the compressor discharge valve.

Standing above each of the five cylinders 12 is a vertical surge tank 43 having a bottom opening 44 communicating with liquid 45 in the cylinder. Upon rearward retraction of the piston 13 in the cylinder, liquid is drawn into the latter as explained above, and also rises in the surge tank to a level 46, somewhat below the level 23 in the supply tank 22, due to the pressure drop through the associated piping. Thereafter, when the piston 13 moves forwardly in the cylinder 12, the valve 29 of course closes and the liquid level rises in the surge tank, as at 47, valve plate 31 preventing discharge through the pipe 28. As a result, liquid pressure in the cylinder rises, as does gas pressure in the compressor cylinder.

The invention makes possible a duplication of the cylinder gas pressure rise in the liquid analogy by virtue of the presence of a tapered insert 48 projecting downwardly and tapering within the surge tank, the insert being suspended from a cross member 49. The insert cross section is adjusted in relation to that of the surge tank so as to cause the liquid level 47 to rise from its lowest to its highest levels as indicated at 46 and 51 in a controlled manner as related to the position of the piston 13 in cylinder 12. Specifically, it is possible to duplicate the polytropic gas compression transformation in the compressor cylinder according to the equation:

$$PV^n = c \qquad (1)$$

by controlled tapering of the insert, so as to increase the pressure on the liquid 45 in the cylinder at the same rate in relation to decreasing volume of the cylinder. In this equation:
Where:

$n =$ "$n$" value of said gas
$P =$ pressure of supply liquid at any time during said pressure increase
$V =$ volume of cylinder at said time.
$c =$ a constant When the rising liquid level 47 in the tank 43 reaches the level 37 in the nozzle channel 33, the valve plate 31 and under plate 41 both rise, and liquid will suddenly discharge into the riser space 34. In the actual compressor installation there will be an associated excess pressure rise or unbalance at the discharge valve due to the mechanical nature of the valve itself, and it is possible to duplicate this excess rise in pressure, when known, by suitable design of the check valve plates 31 and 41 as shown. Thus, the inertia of liquid discharge through the valve in Fig. 2 together with the arresting of valve plate rise by the cross plate 39 and the associated rising and falling of the under plate 41 combine to simulate the excess pressure rise characteristic of gas discharge through the check valve of an actual compressor. It will of course be understood that the valve design may be varied to produce the desired pressure rise effects associated with liquid discharge through restricted openings, as for example the lateral openings 40 uncovered when the valve plate 31 rises. The validity of analog valve performance corresponding to operation of an actual compressor valve may of course be checked by noting the velocity, frequency and amplitude characteristics of surface disturbances produced in the downstream channels as a result of liquid discharge through the valve, which characteristics should correspond with those of actual pressure pulsations in the compressor plant piping. The upper and lower limits of the rising and falling liquid level 37 in nozzle 33 are shown at 137 and 138 in Fig. 2.

Figs. 1 and 4 show channel 36 to be relatively enlarged in cross section as compared with the cross sections of nozzle channels 35, all of which have the same depth for purposes of convenience. Likewise, another relatively enlarged channel 53 communicates with channel 36 through a relatively reduced width channel 54 projecting back upstream into the channel 36. Liquid flowing from the nozzle channels flows in succession through channels 36, 54 and 53, analogous to the double chamber and interconnected pipe pulsations dampener of the type described in U.S. Patent No. 2,405,100 to F. M. Stephens, and thereafter into another channel indicated at 55 analogous to a compressor plant main discharge lateral. From the latter, liquid flows downstream into a channel 56 and turns at 57 into another channel 58, both of which are analogous to the main header of a typical compressor plant.

Parallel channel laterals 59 connecting with channel 56 are analogous to additional compressor plant main discharge laterals, the associated compressors of which have been shut down. End plates 60 terminating these lateral channels 59 in their effect upon surface liquid waves traveling in the channels 59 duplicate the action of the shut down compressors upon pressure pulsations in the like proto-type system. The same is true with respect to channel laterals 61, 62 and 63 having closed ends and branching from channels 56 and 58 as shown, these laterals simulating the effect of a proto-type cooler stub by-pass and to gas processing lines respectively, all of which are effectively closed.

Figure 7:
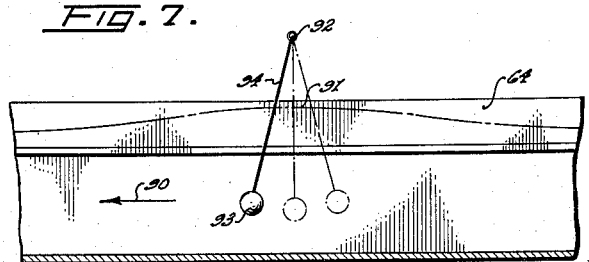
Fig. 7 is a section taken lengthwise through a representative portion of the channel.
Figure 6:
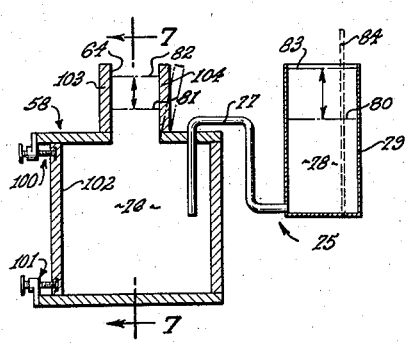
Fig. 6 is a section taken through the liquid channel of line 6—6 of Fig. 1.

It will be understood that the channels 55, 56, 58, 59, 60, 62 and 63 are all filled with liquid to a level extending within the narrowed necks 64 so that surface waves traveling or propagating through the channels are evidenced by amplified wave motion in the channel necks as seen in Figs. 6 and 7. Furthermore, so that the interaction of the surface waves may be more readily and quickly comprehended, as at a glance, the channel structure or frame work may be partly or totally transparent, for example of "Lucite" plastic composition, and the liquid itself may contain a suitable dye enhancing its visibility through the channel walls.

Referring back to Fig. 4, it will be observed that the dampener analog channel spaces 53 and 36 having the same cross section may be combined into one large space by the removal of the separating baffles or walls 65 and 66 forming the narrow intercommunicating channel 54. Thereafter, any number of different baffle shapes may be inserted into this enlarged space to form any desired combination of channels analogous to desired pulsation dampener chamber and pipe configurations, so as to enable study of the transmission of deep channel waves downstream. In other words, what could otherwise be done only at great cost by way of altering the massive prototype pulsation dampener design, can be achieved in the case of the liquid analog by very simple rearrangement of easily constructed baffle plates to form analogous channels. As a result, the invention adapts itself to rapid determination of the optimum design of pulsation dampeners to meet the dampening requirements of particular compressor plant installations. It does this with greater exactitude than is possible in the case of an electrical analog, since the distributed acoustic "impedances" are more closely duplicated in a liquid analogy, wherein the free liquid surface is allowed to be disturbed as a result of displacement of substantially incompressible liquid in a channel, giving the same flow conditions as are present in the acoustic case. Any electrical analog to acoustic flow suffers from its lack of distributed impedance characteristic of both acoustic and liquid flow conditions. The electrical analog also is not able to accurately incorporate pipe geometry, fluid viscosity or that acceleration of the fluid associated with a change of velocity occurring when fluid flows in a pipe of varying cross section. Under these circumstances, even when the flow is so-called "steady state" flow, that is, when there is no time rate of change of flow at a point in a pipe, there will still be an acceleration of fluid moving from point-to-point in the pipe.

In order to validly analogize to prototype gas flow downstream through an effectively endless transmission pipe, the present invention makes use of a sump tank 67, into which liquid from channel 58 flows through a termination grid indicated at 68 in Figs. 1 and 8 and composed of a series of closely spaced plates 69 extending in parallel vertical planes at the end portion of the channel. These plates, which extend vertically throughout the height of the lower enlarged cross section portion 70 of the channel and also upwardly through the liquid surface in the narrowed channeled neck 64, act on the traveling surface waves to suppress or dampen them as they flow into the tank 67, the liquid level in which is maintained at the equilibrium level of liquid in the channel 58. Also suppressed are any reflected waves traveling from the tank back upstream in the channel 58. As a result, insofar as downstream propagating surface disturbances in channel 58 are concerned, they act as though the channel 58 were endless, and the same is true with respect to the constant or rectified flow of liquid through channel 58 into the tank 67. The liquid level standing in the tank is maintained constant by virtue of downflow of excess liquid through stand pipe 71 shown in Fig. 1.

The design of the parallel plate suppressor grid depends upon the kinematic viscosity of the liquid as well as on the geometric parameters associated with the channel and grid, according to the following equation:

$$\frac{sC_a}{\mu/\rho} = 12 \frac{L}{s} \frac{A}{NsH} \qquad (2)$$

where:

$s$ = uniform spacing between plate surfaces
$C_a$ = velocity of propagation of disturbances or waves in the channel, as given below
$\mu/\rho$ = kinematic viscosity of liquid, determinable from physical tables
$L$ = length of plates
$A$ = total cross sectional area of fluid in channel under equilibrium conditions
$N$ = number of plates in grid
$H$ = average depth of plates.

The grid will effectively suppress disturbances propagating in the channel liquid at a frequency below that given by the following expression:

$$\frac{6}{\pi} \frac{\mu/\rho}{s^2}$$

Therefore, it is possible by using more or less closely spaced plates or liquids having different kinematic viscosities to control suppression of waves below any desired upper frequency limit.

Coming now to the design of the channels and pumps in the analog as related to the corresponding components of the prototype compressor plant, the fundamental condition that must be met for purposes of similitude of operating conditions leading to meaningful results has to do with maintaining the ratio of liquid disturbance fundamental wave length to channel length substantially equal to the ratio of gas pulsation fundamental wave length to corresponding transmission pipe length. In other words, if the gas in a particular length of compressor plant piping at a given time under operating conditions is transmitting two pressure pulsations at the fundamental frequency of the compressor, the liquid in the equivalent channel component length must also contain two fundamental propagating disturbances.

The above condition is expressed mathematically as follows:

$$\lambda a = \lambda p \frac{L_a}{L_p} \qquad (3)$$

where:

$\lambda a$ = wave length of fundamental disturbance propagating in analog liquid $$\lambda p = \frac{C_p}{f_p}$$

$C_p$ = net velocity of sound in gas in compressor piping
$f_p$ = fundamental frequency of compressor created gas pressure pulsations
$L_p$ = unit length of compressor piping
$L_a$ = selected analogous length of hydrodynamic analogue channel.

The value of $C_p$ is determinable as the velocity of sound in the gas. The value of $f_p$ referes to the fundamental frequency of the compressor, which in the case of a single acting compressor corresponds to the compressor r.p.m., and in the case of a double acting compressor is twice the compressor r.p.m. Insofar as the ratio of $L_a/L_p$ is concerned, it may be selected to have any convenient value; for example an analog channel may conveniently have 1/20 the length of the corresponding prototype channel.

Having determined the value for $\lambda a$, it remains to adjust the fundamental frequency of the liquid pump or pumps in relation to the cross section design of the channel, for a given liquid therein, according to the equation:

$$\frac{C_a}{f_a} = \lambda a \qquad (4)$$

In Equation 4, $C_a$ represents the velocity of propagation of channeled liquid surface waves or disturbances, while $f_a$ signifies the fundamental frequency of the pump or plural pump combination. A determination of $C_a$ may be had from the following equations:

$$C_a = C_o[1 + \phi(y)] \qquad (5)$$

$$C_p = C_{po}\left[1 + \psi\left(\frac{\Delta P}{P_o}\right)\right] \qquad (6)$$

$$\phi(y) = \psi \frac{\Delta P}{P_o} \qquad (7)$$

where:

$C_o$ = velocity of propagation of channel liquid surface wave or disturbance of very small amplitude, determinable by experimental measurement as by clocking technique
$y$ = height above channel liquid equilibruim level of propagating surface disturbance
$C_p$ = velocity of propagation of actual gas pressure pulse in pipe line, determinable by experiment
$C_{po}$ = velocity of propagation of gas pressure pulse of very small amplitude, determinable by experimental measurement as by clocking technique $\frac{\Delta P}{P_o}$ = ratio of gas pulse amplitude to static pressure of gas in piping $\psi\left(\frac{\Delta P}{P_o}\right)$ = correction factor for gas pulse velocity determinable from Equation 6.

Solving Equations 5, 6 and 7, $$C_a = C_o \frac{C_p}{C_{po}} \qquad (8)$$

Equation 7 must hold true for a one-to-one correspondence to exist as between the propagating gas pulse and liquid disturbance. A close approximation to Equation 7 is the following mathematically derived expression:

$$3/2 \frac{A_1 y}{A_o} = \frac{n-1}{2n} \times \frac{\Delta P}{P_o} \qquad (9)$$

where:

$A_1$ = channel width at liquid surface
$A_o$ = channel cross sectional area
$n$ = "$n$" value of gas.

Thus, if $n = 5/3$, $P_o = 400$ p.s.i. and $\Delta P = 100$ p.s.i., the value of the lefthand side of Equation 9 may be equated to 1/20, and a suitable selection of values $A_1$, $y$ and $A_o$ may be made. Also, the value for $C_a$ in Equation 5 becomes known. Thus, since $$\phi(y) = 3/2 \frac{A_1 y}{A_o}$$

Equation 5 becomes $$C_a = C_o\left[1 + 3/2\frac{A_1 y}{A_o}\right]$$

and the values of A, y and $A_o$ determined in accordance with Equation 9 may be inserted to give the value for $C_a$.

Actually, $A_o$ should be adjusted so that the height of the surface disturbance is attenuated at substantially the same rate as the corresponding pressure pulse flowing along the compressor piping. A more exact statement of this condition is that the attenuation lengths for both the plant piping and corresponding analog channel must be equal, that is to say, the pulses and disturbances decay in amplitude by a factor of 1/e in propagating one characteristic attenuation length, where e is the Naperian base. Attenuation length is directly proportional to the product of characteristic radius of the pipe or channel and the velocity of wave propagation in the fluid, and inversely proportional to the square root of fluid kinematic viscosity and the wave fundamental frequency.

Since liquid kinematic viscosity affects attenuation length, one may select a liquid the kinematic viscosity of which is related to the channel cross section design so as to achieve characteristic channel attenuation length matching that of the corresponding plant piping. Also, the choice of liquid channel cross section and pump combination fundamental frequency may all be so adjusted as to satisfy Equation 4 above. Both $A_o$ and $A_1$ may be varied along the channel as by suitable thrumb screw devices 100 and 101 shown in Fig. 6 to be manually rotatable to laterally independently displace channel side walls 102 and 103, thereby widening or narrowing the channel 76 and the channel neck 64. Such screw devices may be spaced along the channels to vary $A_o$ and $A_1$ therealong as desired for suitable matching of disturbance distortion to pulse distortion, explained above.

The pump combination design is related to the compressors, as respects capacity and therefore sizing, through the following equation:

(Average pump discharge rate)

$$= \frac{C_a}{C_p} \times \text{(average compressor discharge rate)}$$

(10)

The discharge rates in the equation refer of course to the net discharge through the valves. Known values for $C_a$, $C_p$ and the average compressor gas discharge rate, give a value for the average pump discharge rate, and further knowledge as to the pump frequency satisfying Equation 4 permits selection or sizing of the capacities of the known number of pumps to produce the desired average discharge rate.

Referring again to the design of the hydrodynamic analog channels, the ratios of their respective cross sections at location where they open into one another must be the same as the ratios of the corresponding pipe and chamber cross sections in the prototype system, in order that the effect of abruptly changing cross sections upon channel wave propagation may validly simulate the same effect on gas pulsation propagation in the compressor plant piping. However, the actual shape of the cross sections may vary, so long as the cross sectional area ratio is maintained at locations where the channels intercommunicate. Thus, in the analog shown in Fig. 1, the liquid channels extend upward from a common horizontal plane, for purposes of convenience in construction.

Reference to Fig. 6 shows a cross section through the canal 58 and liquid therein, with a liquid pendulum device 75 measuring the amplitude of a particular channel wave propagating through the liquid 76 at and normal to the cross section. The pendulum device consists of a pipe 77 inserted in the liquid 76 and communicating with liquid 78 in an open column 79, so that the liquid level 80 in the receptacle is the same as the level 81 of liquid 76 in the channel neck 64 under equilibrium conditions. The natural frequency of such a pendulum is expressed as follows:

$$f_n \cong \frac{1}{2\pi}\sqrt{\frac{g}{l_c + \frac{A_p l_p}{A_c}}} \qquad (11)$$

where:

g=acceleration due to gravity
$l_c$=length or height of liquid standing in column 79
$A_c$=cross sectional area of liquid in column 79
$l_p$=length of pipe 77
$A_p$=cross sectional area of liquid in pipe When the frequency of wave disturbances propagating through the channel liquid is the same as f, the liquid column 78 will move up and down with increased amplitude and in resonance relation therewith, as designated by the raised liquid surfaces 82 and 83 in the channel neck 64 and column 79 respectively. Tuning of the pendulum is easily accomplished by varying the column liquid effective cross section as by changing the lateral position of a vertical baffle 84 in the column liquid. As a result, the adjustable liquid pendulum device permits determination of the amplitudes of a wide range of various pressure harmonics present in the liquid channel.

The lengthwise cross section taken through the channel 58, Fig. 7 shows a typical wave propagating along the channel in the direction of arrow 90, the wave crest 91 passing the location of a mechanical pendulum consisting of a support 92 above the channel, and a metal ball 93 suspended by a fine string 94 from the support. This particular pendulum device permits easy determination of the relative frequencies of the various harmonic waves propagating in the channel, since the length of the string can be adjusted until the natural frequency of the pendulum matches that of any particular harmonic waves, at which time the pendulum will be excited into swinging relation determinative of the harmonic frequency.

It will be understood that flow through the hydrodynamic analog may be reversed as by making valve 31 open and valve 29 close upon the suction stroke of piston 13, and valve 31 close and valve 29 open on the piston compression stroke, thereby simulating conditions in the compressor plant piping at the suction or intake side of the compressor.

Referring again to optimization of a pulsation dampener design, the sizes of the channels 36, 53 and 54 in Fig. 4 may be rapidly varied and adjusted, with the liquid pumps operating, until surface waves of any frequency flow upstream or downstream in any of the channel necks 64. Even greater effective attenuation of disturbances may be secured by using the pendulum type instruments referred to above to determine the amplitudes and frequencies of transmitted waves, for which a correction may be made in the dampener channel geometry to minimize such transmission. The optimum lengths of the prototype dampener element may then be obtained by multiplying the experimentally arrived at analog dampener channel lengths by the reciprocal of the selected scale factor.

It is also possible to shape the narrowed channel neck 64 of any channel such as 58 in such a way as to match any polytropic transformation governing the state of the gas in the corresponding compressor plant piping, when the gas is subjected to a pulsation, as by angling channel neck side wall 104 with respect to side wall 103, as indicated by the broken lines in Fig. 6, to obtain a variable width neck 64, according to the following: if the constant defining this transformation be denoted by "n," the variable width of the channel neck by "w," the cross-sectional area of the channel by $A_o$, and the rate of change of the width with increasing height of liquid in the channel neck by $$\frac{dw}{dy}$$

the value of "$n$" is given by the following relation, from which the desired relationship between "$w$" and "$y$" (governing the angling of wall 104) may be determined:

$$n = 2 - \left(\frac{dw}{dy}\right)\frac{A_o}{w^2} \quad (12)$$

I claim:

1. The method of simulating propagation of a wave subject to progressive distortion as the wave propagates through fluid in a conduit, that includes adjusting the cross section of a channeled body of test liquid, said liquid corresponding to the fluid in said conduit, and disturbing the liquid to create a liquid disturbance propagating along the channel with an amplitude so related to the wave amplitude that the fluid wave and test liquid disturbance are similarly progressively distorted during said propagation.

2. The method of simulating propagation of a wave subject to progressive distortion as the wave propagates through fluid filling a conduit, that includes adjusting the cross section of a channeled body of test liquid along the liquid channel free surface, said liquid corresponding to the fluid in said conduit, and disturbing the liquid to create a liquid disturbance propagating through the channel with an amplitude at said surface so related to the wave amplitude that the fluid wave and test liquid disturbance are similarly progressively distorted during said propagation.

3. The method of simulating propagation of fluid pressure pulsations within a conduit, that includes sizing the cross section of a channeled body of test liquid, said liquid corresponding to the fluid in said conduit, and repeatedly displacing liquid in said body to create disturbances propagating along the liquid channel in such relation that the ratio of disturbance fundamental wave length to channel length is substantially the same as the ratio of pulsation fundamental wave length to conduit length.

4. The method of simulating propagation of compressor created gas pressure pulsations within a conduit communicating with a compressor, that includes sizing the cross section of a channeled body of liquid having a free surface extending along the channel, said liquid corresponding to the gas in said conduit, and repeatedly displacing liquid in said body to create disturbances propagating through said channel and along said surface in such relation that the ratio of disturbance fundamental wave length to channel length is substantially the same as the ratio of pulsation fundamental wave length to conduit length.

5. The method of simulating propagation of compressor created gas pressure pulsations within a conduit communicating with a compressor, that includes sizing the cross section of a channeled body of liquid having a free surface extending along the channel, said liquid corresponding to the gas in said conduit, and repeatedly displacing liquid into said body to create disturbances propagating through said channel and along said surface in such relation and with such amplitudes that the ratio of disturbance fundamental wave length to channel length is substantially the same as the ratio of gas pulsation fundamental wave length to conduit length and the amplitude ratios of harmonic liquid disturbances to fundamental gas disturbances are substantially the same as the amplitude ratios of corresponding harmonic gas pulsations to fundamental gas pulsations.

6. The method of simulating propagation of compressor created gas pressure pulsations within a conduit communicating with a compressor, that includes sizing the cross section of a channeled body of liquid having a free surface extending along the channel, said liquid corresponding to the gas in said conduit, and repeatedly displacing liquid into said body below said free surface to create disturbances propagating through said channel along said surface in such relation that the ratio of disturbance fundamental wave length to channel length is substantially the same as the ratio of pulsations fundamental wave length to conduit length.

7. The method of claim 6 comprising repeatedly displacing liquid into said body at a fundamental frequency such that the wave length of the fundamental disturbance has substantially the value $$\lambda a = \lambda p \frac{L_a}{L_p}$$

where:

$$\lambda p = \frac{C_p}{f_p}$$

$C_p$ = net velocity of sound in gas in compressor piping
$f_p$ = fundamental frequency of compressor created gas pressure pulsations
$L_p$ = unit length of compressor piping
$L_a$ = selected analogous length of hydrodynamic analogue channel.

8. The method of claim 7 comprising sizing the channel cross section in relation to the disturbance fundamental frequency in accordance with the values in the equation $$\frac{C_a}{f_a} = \lambda a$$

where:

$$C_a = C_o \frac{C_p}{C_{po}}$$

$C_a$ = velocity of propagation of channeled liquid disturbance
$C_o$ = velocity of propagation of channel liquid surface wave or disturbance of infinitely small height (determinable by experimental measurement)
$C_p$ = velocity of propagation of actual gas pressure pulse in pipe line, determinable by experiment
$C_{po}$ = velocity of propagation of gas pressure pulse of very small amplitude, determinable by experimental measurement as by clocking technique.

9. The method of claim 8 comprising sizing the channel cross section dimensions substantially in accordance with the equation $$3/2 \frac{A \cdot y}{A_o} = \frac{n-1}{2n} \frac{\Delta P}{P_o}$$

where:

$n$ = "$n$" value of said gas
$y$ = height above channel liquid equilibrium level of propagating surface disturbance
$\frac{\Delta P}{P_o}$ = ratio of gas pressure pulse amplitude to static pressure of gas in piping
$A_1$ = channel width at liquid surface
$A_o$ = channel cross sectional area.

10. The method of simulating propagation of gas pressure pulsations within a conduit communicating with a compressor, that includes narrowing the cross section of a channeled body of liquid along the liquid channel visible free surface, said liquid corresponding to the gas in said conduit, and repeatedly displacing liquid in said body to create disturbances propagating through said channel and along said surface in such relation and with amplitudes so related to gas pulse amplitudes that the liquid disturbances and gas pulses are similarly progressively distorted during said propagation and the ratio of disturbance fundamental wave length to channel length is substantially the same as the ratio of pulsations fundamental wave length to conduit length.

11. The method of simulating propagation of compressor created gas pressure pulsations within a conduit in series communicating with a compressor valve, that includes repeatedly displacing liquid through a restricted opening into a body of channeled liquid to create disturbances propagating along the liquid channel, said liquid corresponding to the gas in said conduit and said repeated liquid displacement corresponding to said gas pressure pulsations.

12. The method of claim 11 including suppressing disturbances that have propagated along the channel and are reflected at the end thereof.

13. The method of simulating propagation of compressor created gas pressure pulsations within a conduit in series communication with a compressor valve, that includes repeatedly displacing supply liquid through a restricted opening into a body of channeled liquid having a free surface above said opening to create surface disturbances propagating visibly along said channel, said liquid corresponding to the gas in said conduit and said repeated liquid displacement corresponding to said gas pressure pulsations, and subjecting said supply liquid to increasing pressure immediately prior to said displacement thereof.

14. The method of claim 13 comprising subjecting said supply liquid to increasing pressure in a supply chamber, substantially in accordance with the equation $$PV^n = c$$

where:

$n =$ "$n$" value of said gas
$P =$ pressure of supply liquid at any time during said pressure increase
$V =$ volume of chamber at said time
$c =$ a constant.

15. The method of simulating propagation of compressor created gas pressure pulsations within a conduit and a pulsation dampener in series communication with a compressor valve, that includes sizing several intercommunicating bodies of channeled liquid corresponding in their intercommunication to the gas stream in said dampener and conduit, said liquid bodies having free surfaces extending along said channels, and repeatedly displacing supply liquid through a restricted opening communicating with said channels to create surface disturbances propagating visibly along said channels and attenuated in the channel corresponding to said conduit.

16. The method of simulating propagation of compressor created gas pressure pulsations within a conduit and a pulsation dampener in series communication with a compressor valve, that includes sizing several intercommunicating bodies of channeled liquid corresponding in their intercommunication to the gas stream in said dampener and conduit, said liquid bodies having free surfaces extending along said channels, and repeatedly displacing supply liquid through a restricted opening communicating with said channels to create attenuated disturbances propagating visibly along the channel corresponding to said conduit in such relation that the ratio of disturbance fundamental wave length to channel length is substantially the same as the ratio of pulsations fundamental wave length to conduit length.

17. The method of simulating propagation of compressor created gas pressure pulsations within a conduit and a pulsation dampener in series communication with a compressor valve, said dampener comprising a pair of relatively large chambers interconnected by pipe means, said method including sizing several intercommunicating bodies of channeled liquid corresponding in their intercommunication to the gas stream in said chambers, pipe means and conduit, said liquid bodies having free surfaces extending along said channels, and repeatedly displacing supply liquid through a restricted opening in communication with said channels to create attenuated disturbances propagating visibly along the channel corresponding to said conduit in such relation that the ratio of disturbance fundamental wave length to channel length is substantially the same as the ratio of pulsation fundamental wave length to conduit length, and flowing said liquid through said channels to maintain said undisturbed liquid channel size.

18. A hydrodynamic analog simulating wave propagation with progressive distortion through fluid in a conduit, comprising a channel, a body of test liquid in the channel having a free surface, and a disturbance propagating through the channel in said liquid and visibly along said surface, said channel being sized at said surface so that the fluid wave and test liquid disturbance are similarly progressively distorted during said propagation.

19. A hydrodynamic analog simulating propagation of pressure pulsations through fluid in a conduit comprising a channel, a body of test liquid in the channel, and disturbances propagating in the liquid along the channel, said disturbances being spaced in such relation along the channel and the channel being sized so that the ratio of disturbance fundamental wave length to channel length is substantially the same as the ratio of pulsation fundamental wave length to conduit length.

20. A hydrodynamic analog simulating propagation of pressure pulsations through fluid in a conduit, comprising a channel, a body of test liquid in the channel, and means repeatedly displacing liquid in said body thereby creating disturbances propagating in the liquid along the channel, said disturbances being spaced in such relation along the channel and the channel being sized so that the ratio of disturbance fundamental wave length to channel length is substantially the same as the ratio of pulsation fundamental wave length to conduit length.

21. A hydrodynamic analog simulating propagation of compressor created pressure pulsations propagating through gas in a conduit, comprising a channel, a body of liquid flowing in the channel having a free surface extending therealong, and means repeatedly displacing liquid into said body below the free surface thereof and thereby creating liquid surface disturbances propagating along the channel, said disturbances being spaced in such relation along the channel and the channel being sized so that the ratio of disturbance fundamental wave length to channel length is substantially the same as the ratio of pulsation fundamental wave length to conduit length.

22. The invention as defined in claim 21 in which the wave length of fundamental disturbance has substantially the value $$\lambda a = \lambda p \frac{L_a}{L_p}$$

where:

$$\lambda p = \frac{C_p}{f_p}$$

$C_p =$ net velocity of sound in gas in compressor piping
$f_p =$ fundamental frequency of compressor created gas pressure pulsations
$L_p =$ unit length of compressor piping
$L_a =$ selected analogous length of hydrodynamic analog channel.

23. The invention as defined in claim 22 in which said channel cross section size and said disturbance fundamental frequency have values related substantially in accordance with the equation $$\frac{C_a}{f_a} = \lambda a$$

where:

$$C_a = C_o \frac{C_p}{C_{po}}$$

$C_a =$ velocity of propagation of channeled liquid disturbance $C_o$ = velocity of propagation of channel liquid surface wave or disturbance of infinitely small height (determinable by experimental measurement)

$C_p$ = velocity of propagation of actual gas pressure pulse in pipe line, determinable by experiment $C_{po}$ = velocity of propagation of gas pressure pulse of very small amplitude, determinable by experimental measurement as by clocking technique.

24. The invention as defined in claim 23 in which said channel cross section dimensions have values related substantially in accordance with the equation $$3/2 \frac{A_l y}{A_o} = \frac{n-1}{2n} \frac{\Delta P}{P_o}$$

where:

$n$ = "n" value of said gas
$y$ = height above channel liquid equilibrium level of propagating surface disturbance
$\frac{\Delta P}{P_o}$ = ratio of gas pressure pulse amplitude to static pressure of gas in piping
$A_l$ = channel width at liquid surface
$A_o$ = channel cross sectional area.

25. A hydrodynamic analog simulating propagation of gas pressure pulsations in a conduit in series communication with the valve of a compressor operating to create the pulsations, comprising a channel, a body of liquid in the channel, and means repeatedly displacing liquid through a restricted opening and into said body thereby creating disturbances propagating in the liquid along the channel, said liquid corresponding to the gas in said conduit and said repeated liquid displacement corresponding to said gas pressure pulsations.

26. A hydrodynamic analog simulating propagation of gas pressure pulsation in a conduit in series communication with the valve of a compressor operating to create the pulsations, comprising a channel, a body of liquid in the channel having a free surface extending therealong, a valve communicating with said liquid body, and means repeatedly displacing supply liquid through said valve and into said body below said surface thereby creating surface disturbances propagating visibly along said channel, said liquid corresponding to the gas in said conduit and said repeated liquid displacement corresponding to said gas pressure pulsations.

27. The invention as defined in claim 26 including means suppressing disturbances that have propagated along said channel and are reflected at the end thereof.

28. The invention as defined in claim 27 comprising a series of laterally spaced plates extending in the channel liquid between the channel sides and in the direction of said disturbance propagation.

29. The invention as defined in claim 28 comprising said parallel plates standing upright in the channel, said plates being sized and spaced substantially in accordance with the equation $$\frac{sC_a}{\mu/\rho} = 12 \frac{L}{s} \frac{A}{NsH}$$

where:

$s$ = uniform spacing between plate surfaces
$C_a$ = velocity of propagation of disturbances or waves in the channel, as given below
$\mu/\rho$ = kinematic viscosity of liquid, determinable from physical tables
$L$ = length of plates
$A$ = total cross sectional area of fluid in channel under equilibrium conditions
$N$ = number of plates in grid
$H$ = average depth of plates.

30. The invention as defined in claim 29 in which said liquid flows along the channel, and including a receptacle receiving liquid from said channel so as to maintain the average level of liquid therein substantially constant.

31. The invention as defined in claim 26 comprising a pump piston reciprocating in a chamber communicating with said analog valve.

32. The invention as defined in claim 27 including means subjecting said supply liquid to increasing pressure immediately prior to said displacement thereof through the analog valve.

33. The invention as defined in claim 32 comprising a column of liquid higher than said supply liquid and into which said supply liquid is adapted to flow and rise during piston displacement for exerting said increasing pressure substantially in accordance with the equation $$PV^n = c$$

where:

$n$ = "n" value of said gas
$P$ = pressure of supply liquid at any time during said pressure increase
$V$ = volume of chamber at said time
$c$ = a constant.

34. The invention as defined in claim 33 in which the horizontal cross section of said column of liquid decreases in an upward direction.

35. The invention as defined in claim 34 including a receptacle receiving said column of liquid and standing at least as high as the surface level of said channeled liquid.

36. A hydrodynamic analog simulating propagation of gas pressure pulsations in a conduit connected through a pulsation dampener in series communication with the valve of a compressor operating to create the pulsations attenuated by the dampener, comprising several intercommunicating channels corresponding in their intercommunication to the gas stream in said dampener and conduit, intercommunicating bodies of liquid in said channels having free surfaces extending therealong, and means repeatedly displacing supply liquid through a valve communicating with said liquid bodies thereby creating surface disturbances propagating visibly along said channels at the fundamental repetition fequency and attenuated in the channel corresponding to said conduit.

37. A hydrodynamic analog simulating propagation of gas pressure pulsations in a conduit connected through a pulsation dampener in series communication with the valve of a compressor operating to create the pulsations attenuated by the dampener, comprising several intercommunicating channels corresponding in their intercommunication to the gas stream in said proposed dampener and conduit, intercommunicating bodies of liquid in said channels having free surfaces extending therealong, and means repeatedly displacing supply liquid through a valve communicating with said liquid bodies thereby creating attenuated surface disturbances propagating visibly along the channel in such relation that the ratio of disturbance fundamental wave length to channel length is substantially the same as the ratio of pulsation fundamental wave length to conduit length.

38. The invention as defined in claim 37 in which the channels corresponding to said dampener comprise two channels of relatively large cross section and a third channel of relatively reduced cross section communicating between said two channels.

39. The invention as defined in claim 37 in which the channel corresponding to said conduit is sufficiently transparent to permit said surface disturbances to be seen therethrough.

40. The invention as defined in claim 37 including a pendulum weight in said channel corresponding to said conduit, and means suspending said weight in the channel liquid to oscillate at the disturbance frequency whereby the disturbance frequency may be observed.

41. The invention as defined in claim 33 including an open receptacle containing liquid communicating through a line with liquid in a channel, said receptacle being sized so that the liquid therein rises and falls at said fundamental disturbance frequency whereby the disturbance amplitude may be observed.

42. A hydrodynamic analog simulating propagation of pressure pulsations through fluid in a conduit, comprising a channel, a body of liquid having a free surface in the channel, and means repeatedly displacing liquid in said body and thereby creating liquid surface disturbances propagating along the channel, said disturbances being spaced in such relation along the channel and the channel being sized so that the ratio of disturbance fundamental wave length to channel length is substantially the same as the ratio of pulsation fundamental wave length to conduit length, the upper portion of said channel having substantially reduced width above and below said surface.

43. The invention as defined in claim 42 in which said channel cross section dimensions have values related substantially in accordance with the equation $$n = 2 - \left(\frac{dw}{dy}\right)\frac{A_o}{w^2}$$

where:

$n =$ "$n$" value of gas in said conduit
$w =$ width of said channel upper portion
$y =$ height above channel liquid equilibrium level of propagating surface disturbance
$A_o =$ channel cross sectional area
$\frac{dw}{dy} =$ rate of change of "$w$" with respect to "$y$".

References Cited in the file of this patent

UNITED STATES PATENTS

| | | |
|---|---|---|
| 2,207,270 | Semar | July 9, 1940 |
| 2,482,861 | Montagne | Sept. 27, 1949 |

FOREIGN PATENTS

| | | |
|---|---|---|
| 943,787 | France | Oct. 11, 1948 |